WILLEM B. VELSINK
INVENTOR

BY BUCKHORN, BLORE, KLARQUIST & SPARKMAN
ATTORNEYS

United States Patent Office 3,525,041
Patented Aug. 18, 1970

3,525,041
MAGNETIC FIELD MEASURING METHOD AND DEVICE EFFECTIVE OVER A WIDE FREQUENCY RANGE
Willem B. Velsink, Beaverton, Oreg., assignor to Tektronix Inc., Beaverton, Oreg., a corporation of Oregon
Filed Aug. 8, 1966, Ser. No. 570,810
Int. Cl. G01r 33/00, 33/06
U.S. Cl. 324—117      15 Claims

ABSTRACT OF THE DISCLOSURE

A current probe for measuring current in a conductor is provided with a winding for producing an output in an alternating current frequency range and a Hall device for producing an output at zero and low frequencies. The Hall device output is applied to the winding in a sense for opposing the measured flux. Means combine the outputs from the winding and from the Hall device.

---

Figure 1:
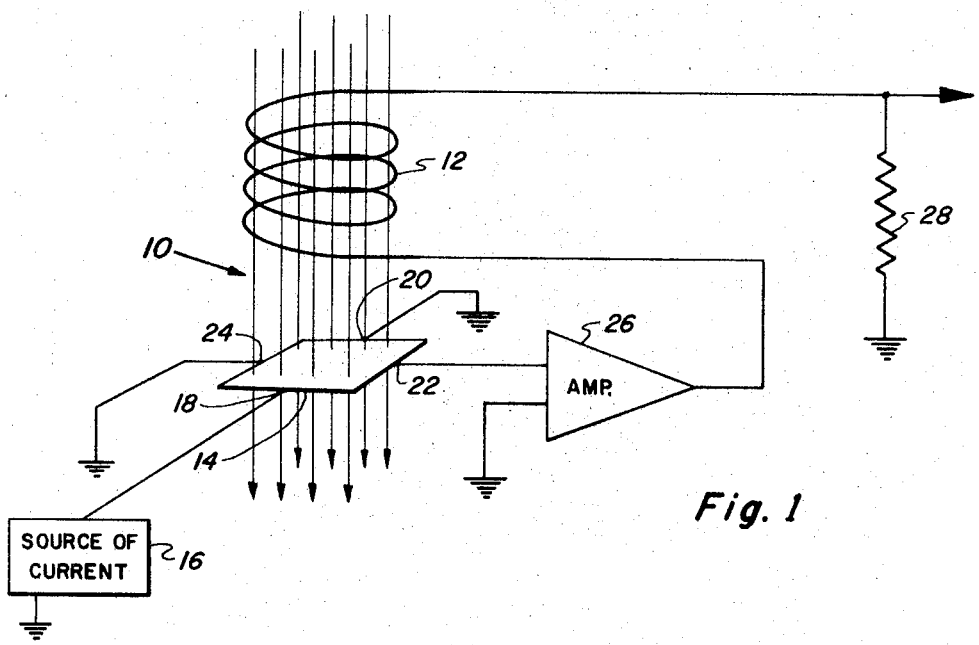

This invention relates to a magnetic field measuring method and device and particularly to such a method and device for accurately ascertaining the magnitude of a magnetic field, or current producing such magnetic field, over a broad range of frequencies.

Prior means and methods for measuring a magnetic field have been limited in frequency range due to bandwidth restrictions of the detection means employed. Thus in an ordinary transformer the secondary output current is an accurate representation of the input current only at frequencies within a given alternating current range. As the frequency of alternating current input drops toward zero, secondary output current is no longer produced, and, at intermediate frequencies, output is likely to be an inaccurate representation of input.

It is accordingly an object of the present invention to provide an improved magnetic field measuring method and device operative over a wide frequency range for providing an accurate representation of such magnetic field.

It is another object of the present invention to provide a device for accurately determining the current flowing in an input conductor, or input winding, over a wide frequency range.

It is another object of the present invention to provide an improved means and method for measuring input magnetic fields, or currents producing the same, in an accurate manner not affected by magnetic circuit nonlinearities or electric circuit nonlinearities.

It is a further object of the present invention to provide multiple means for measuring a magnetic field or currents establishing such magnetic field wherein the said multiple means accurately complement one another's operation to provide an accurate output proportional to the said magnetic field.

It is another object of the present invention to provide an improved probe for conveniently and accurately measuring currents in conductors over a broad frequency range without requiring the disconnecting of such conductors.

Briefly, in accordance with an important aspect of the present invention, a magnetic field is measured by producing magnetomotive force for nulling such magnetic field and this nulling force is produced in two components, a first effective at alternating current frequencies, and a second effective down to zero frequency. The two components combine to provide the total nulling force and the total value of the two components is measured in order to ascertain the nulled input flux. The nulling method has the advantage of being insensitive to magnetic and electric circuit nonlinearities and is accurate despite the fact that two nulling sources are used. The two sources are forced to complement one another. One or the other or both are employed to null the total flux with the resultant output being proportional to the total nulling acion required, over a wide frequency range.

According to a particular embodiment of the present invention, a first nulling source comprises an output winding wound around a magnetic circuit containing the input flux. This magnetic circuit may link an input conductor or winding in which an unknown current flows. The output winding provides an output current and a nulling effect on the input flux within an alternating current frequency range. Also included in the magnetic circuit is a Hall device which is effective at lower frequencies down to zero. The output current of the Hall device is coupled to the aforementioned output winding with a polarity so as to produce a force opposing the input flux being measured. The combined output of the current derived from the output winding and that from the Hall device comprises the total signal for measuring the input flux, or current producing such flux, and is accurate over a wide frequency range.

Figure 2:
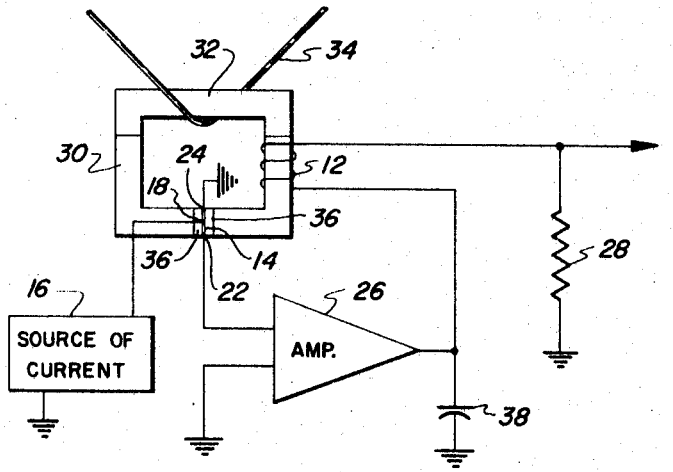
Figure 3:
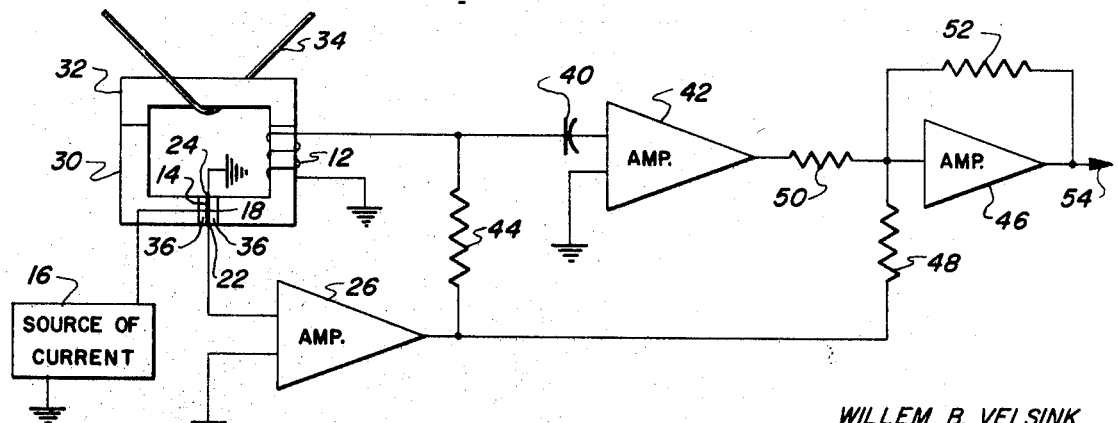

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements and in which:

FIG. 1 is a schematic diagram explanatory of the concept of the present invention, FIG. 2 is a schematic diagram of a first embodiment according to the present invention, and FIG. 3 is a schematic diagram of an alternative embodiment of the present invention.

The present invention has as a principal object thereof the measurement of the value of an unknown magnetic flux which is illustrated generally at 10 in FIG. 1. This magnetic flux may, for example, be produced by an unknown current in a conductor, or in the primary winding of a transformer (not shown). For the purpose of indicating and measuring such flux, a first induction coil or winding 12 is provided which encloses or links the flux 10 being measured. A voltage is induced in this winding producing a current at alternating current frequencies, in a direction causing a magnetomotive force in a direction opposing the input flux 10. For purposes of convenience, the opposing magnetomotive force will be spoken of as producing an opposing flux.

A Hall device, principally comprising a conductive or semi-conductive Hall plate 14, is disposed such that the same flux 10 passes through the Hall plate at substantially a right angle thereto. A source of current 16, preferably direct current, is connected to supply current through the Hall plate from point 18 to point 20. A resultant current can then be measured between edge points 22 and 24 due to the Hall effect, wherein points 22 and 24 are disposed in a line substantially orthogonal to the line between points 18 and 20. This Hall current is a measure of the flux 10 particularly for a substantially constant or unchanging field. The Hall current is somewhat less responsive to input flux at higher frequencies.

The current at point 22 is applied as an input to a D.C. amplifier 26 while point 24 is returned to a ground connection common to amplifier 26. The output of amplifier 26 is connected to winding 12. The polarity of this later connection is such that the output current from amplifier 26 flowing through winding 12 produces a flux which also opposes input flux 10. The remaining terminal of winding 12 is returned through an output resistor 28 to ground. Output resistor 28 provides a voltage drop proportional to the current in winding 12.

The current in winding 12 is thus derived in the form of two components. The first is the result of voltage induced therein because of change of flux linking winding 12. This current is proportional to $d\phi/dt$ or the rate of change of flux with time. Such current is primarily effective in a high frequency range or pass band and flows in a direction producing flux opposing the input flux 10. In this pass band, this current produces a flux which substantially nulls the original flux 10, except for magnetizing flux and the like. Winding 12 thus operates in this range as the secondary of a transformer wherein the flux 10 is, for example, that produced by means of the transformer primary (not shown). As the current resulting from the voltage induced in winding 12 flows through resistor 28, the voltage across resistor 28 is indicative thereof, and therefore of the flux nulling the input flux 10 at alternating current frequencies.

The second component of current in winding 12 is the output of amplifier 26. The output of amplifier 26 is applied to winding 12, as indicated, in a direction such that the amplified Hall current flows through winding 12 in a direction opposing the input flux 10. At lower frequencies, at which the induced current in winding 12 is less effective, the Hall current will be effective to null the input flux 10. This Hall current also flows through output resistor 28, adding to the current derived from winding 12, and produces a voltage thereacross indicative of the flux nulling the input flux down to zero frequency, or where the flux is substantially unchanging.

It is important to notice that the total current through resistor 28 is the current producing the toal flux sufficient to null the original input flux 10. When the input flux is substantially nulled, further voltage is neither induced in winding 12, nor is further current provided by way of the Hall device. At higher frequencies, the output current is principally a result of voltage induced in winding 12, while at zero frequency, this current is all derived from the Hall device. If, at an intermediate frequency, only part of the input flux is canceled due to the action of the Hall device only the balance can produce a current output from the action of the induced voltage and this additional current is effective in providing the further cancellation. A point is then reached wherein the total output current produces just the total required nulling flux. Thus, in the region of in between the optimum frequency range of winding 12 and that of the Hall device, the two sources are forced to cooperate and provide just the right nulling current and produce an output indicative of the input flux. If one source fails or partially fails, for instance the Hall device, the other source is forced to take over to an extent and still provide a substantial output signal. The winding and the Hall device thus operate together effectively over a wide frequency range. For the foregoing arrangement to operate satisfactorily, the upper frequency cutoff of the pass band for the Hall device should be substantially greater than the low frequency cutoff for winding 12. The portion of the output signal which comes from the Hall device and from winding 12 is controlled principally by the bandwidth of amplifier 26 and of the Hall device.

For definition purposes, the winding 12 comprises the means for causing a counterflux at alternating current frequencies while the Hall device and circuit comprises means for causing a counterflux at lower frequencies down to zero. The series circuit therebetween, including the common output resistor 28, comprises the means for determining the combined extent of this counterflux.

Referring to FIG. 2, a schematic diagram illustrating a practical embodiment of apparatus according to the present invention, a magnetic circuit comprising a continuous annular core includes a first longer U-shaped portion 30 and a shorter matching U-shaped portion 32. The two portions are joinable in abutting relationship as shown. Portion 32 is conveniently removable from portion 30 for the insertion of a primary input conductor 34 within which a current is to be measured. After insertion of conductor 34, portion 32 is returned to its original position abutting portion 30.

The core portions 30 and 32 are desirably embodied in a portable probe for convenient coupling to a substantially stationary conductor 34 in which current is to be measured. Such a probe then provides a convenient input coupling to an oscilloscope or other measuring device. The cable to such probe includes conductors leading to winding 12 as wound around core portion 30, as well as the conductors leading to Hall plate 14.

Both the core portions 30 and 32 are formed of magnetic material and preferably ferrite material. The major part of at least core portion 30 is formed of a high permeability ferrite. However, in the region of Hall plate 14, cross-sectional layers 36 of the core comprise a high resistance ferrite to prevent shorting of the Hall plate. These layers 36 are suitably approximately 30 mils in thickness and are shown in exaggerated fashion in FIG. 2 for ease of illustration. The Hall plate 14 is suitably evaporated onto one of the layers 36 and is therefore extremely thin. Alternatively, the Hall plate may comprise a thin layer of single crystalline material. The Hall plate 14 is suitably a semi-conductor and may comprise germanium, gallium arsenide or gallium indium antimonide. The Hall plate 14 extends across the entire cross section of the core portion 30 and, therefore, intercepts the entire core flux or the same input flux linked by winding 12.

As in the previous illustrative embodiment, a source of direct current 16 is coupled to point 18 on Hall plate while point 22 is connected as an input to D.C. amplifier 26. Point 24 and point 20 (directly behind point 18) are returned to ground. The output of amplifier 26 is again coupled to winding 12 such that the output of amplifier 26 in response to flux in the core delivers a current to winding 12 in such a direction as to produce a flux opposing the input flux. The combined current in winding 12, causing the counter-flux, that is the current from amplifier 26 as well as the current resulting from voltage induced in winding 12, is coupled through resistor 28. The current in resistor 28 and therefore the voltage thereacross, is a direct measure of or directly proportional to the current in conductor 34 over a wide range of frequencies. The ratio between the two is, of course, determined by the turns ratio between primary conductor 34 and secondary winding 12.

As can be seen, the sources of current at higher and lower frequencies are effectively connected in series in the FIG. 2 embodiment. D.C. amplifier 26 preferably has a low output impedance and the output thereof may be shunted by a capacitor 38 effective at high frequencies to provide a return path for current derived from winding 12. Amplifier 26 provides sufficient amplification in this circuit so that the amplified Hall current in winding 12 and resistor 28 in the Hall device pass band is commensurate with current derived from winding 12 for an equivalent input flux or current in the frequency pass band of the winding 12.

Referring to FIG. 3, the output from winding 12 and that from amplifier 26 are not added in series as in the previous embodiment, but rather these outputs are combined in parallel fashion in adding circuitry as hereinafter described. The output of winding 12 is A.C. coupled via capacitor 40 to a wide band amplifier 42. Amplifier 42 may amplify the higher frequency signal from winding 12 to a magnitude substantially commensurate with the low frequency signal as amplified in an amplifier 26. The output of amplifier 26, being the amplified Hall current, is applied to winding 12 in a direction for opposing the input flux and is coupled thereto through a dropping resistor 44. However, the output of amplifier 26 is also applied to a summing circuit comprising an operational amplifier 46, by way of input resistor 48 of the operational amplifier. The output of wide band amplifier 42 is also applied to the operational amplifier through input resistor 50. The operational amplifier includes a feedback resistor 52 and provides an output at terminal 54 proportioinal to the combined current in winding 12, thereby providing a measure of the A.C. and D.C. components of the core flux, and therefore, the current in conductor 34 over a wide frequency range. The combined current is again a measure of the flux required to null the input flux produced by conductor 34. It is appreciated the foregoing summing circuit is given by way of example and other suitable circuits may be substituted therefor.

Since the device according to the present invention is a nulling device, a high value of core flux is avoided and magnetic circuit nonlinear effects are greatly reduced or eliminated. This can be considered the result of the strong negative feedback in winding 12. Moreover, Hall voltage magnitude and nonlinearity are not of great importance so long as there is sufficient current available to produce flux for nulling the input flux. The present circuit is also independent of minor variations in air gap in the magnetic circuit and in gain of the feedback loop. There is also in effect an automatic crossover between the high and low frequency sources wherein these are forced to complement one another to produce an accurate output. The output is therefore always a measure of the combined nulling flux.

While I have shown and described several embodiments of my invention, it will be apparent to those skilled in the art that many changes and modifications may be made without departing from my invention in its broader aspects. I therefore intend the appended claims to cover all such changes and modifications as fall within the true scope and spirit of my invention.

I claim:
1. Apparatus for ascertaining the value of a first magnetic flux comprising:
   a coil for intercepting said first magnetic flux and producing a first current at first alternating current frequencies in response thereto, wherein the flow of said first current is in a direction for opposing said first flux,
   means also responsive to said first flux and operative at direct currents and lower alternating current frequencies to produce a second current, and an amplifier for amplifying said second current, said amplifier amplifying said second current for accurately reproducing an output proportional thereto over at least a portion of the pass band of the last mentioned means and at least to a frequency crossover region with said coil at intermediate frequencies,
   means for adding said second current as amplified by said amplifier to said coil in a sense also opposing said first flux, and
   means for producing an output indicative of the combined value of said first and second currents.

2. The apparatus according to claim 1 wherein said means for producing an output indicative of the combined value of said first and second currents comprises an output resistor in series with a series circuit including said coil and the output of the amplifier, said amplifier having a low and substantially linear output impedance in the frequency range of said first alternating current frequencies thus supplying a return path for currents derived from said coil.

3. The apparatus according to claim 1 wherein said means operative at direct currents and low frequencies comprises a Hall device including a Hall plate oriented to intercept the first flux wherein said Hall plate is disposed in a plane substantially perpendicular to said first flux for producing said second current in response thereto.

4. The apparatus according to claim 2 wherein said amplifier is provided with a capacitor shunting the output thereof so as to provide said low output impedance in the frequency range of said first alternating current frequencies.

5. Apparatus for ascertaining the value of a first magnetic flux comprising:
   a magnetic circuit for concentrating said flux,
   a coil wound on said magnetic circuit in which a current flows indicative of first alternating current components of said flux, said current being in a direction to produce a second flux opposing said first flux,
   a Hall device including a Hall plate inserted in said magnetic circuit for intercepting said first flux,
   means for providing a direct current in a first direction through said Hall plate,
   means for measuring an output current in an orthogonal direction through said Hall plate,
   means for amplifying said last mentioned current substantially linearly over at least a portion of the A.C. and D.C. pass band of the Hall plate and to at least a frequency crossover region with said coil at intermediate frequencies, and for adding said last mentioned current as amplified to said coil in a direction also producing a flux opposing said first flux, and
   output means coupled to said coil for producing a voltage drop indicative of the current in said coil and therefore indicative of the combined opposed flux, wherein said coil and said Hall device accurately complement the output of one another because of the input opposing action of said flux.

6. Means for determining the current in a conductor over a wide frequency range comprising:
   a core of magnetic material for linking said conductor,
   a coil wound on said magnetic core for providing a current indicative of a first alternating component of flux produced by current in said conductor linking said core, said current in said coil producing a flux in said core for nulling the flux produced by said conductor,
   a Hall device including a Hall plate inserted across a cross-section of said core to intercept the magnetic flux therein, said Hall plate producing a current indicative of flux in said core including the steady value thereof and lower frequency alternating current components,
   first amplifier means responsive to the current from said Hall plate and producing an amplified output substantially linearly proportional thereto over at least a substantial portion of the pass band of said Hall plate,
   means for applying the output of said amplifier to said coil in a direction for opposing the flux produced by current in said conductor, and
   output means for measuring the combined current as induced in said coil and as provided via said amplifier means from said Hall plate.

7. The apparatus according to claim 6 wherein said output means for measuring the combined current comprises a second amplifier means coupled to said coil for alternating currents, a summing amplifier means, and means for applying the output of the first amplifier means and the output of said second amplifier means to said summing amplifier means in an additive sense to provide an output indicative of combined current in said coil.

8. The apparatus according to claim 6 wherein the upper frequency cutoff of said Hall device is greater than the lower frequency at which said coil is effective in providing an induced voltage causing a current flow indicative of said flux produced by said conductor.

9. The apparatus according to claim 6 wherein said output means for measuring the combined current comprises an output impedance in series with a series circuit including said coil and the output of the first amplifier means, said first amplifier means having a low and substantially linear output impedance in the frequency range of said first alternating component of flux, thus supplying a return path for A.C. currents derived from said coil.

10. The apparatus according to claim 9 wherein the Hall plate comprises a thin layer of semiconductor material.

11. The apparatus according to claim 9 wherein at least the fixed portion of said core is formed of high permeability ferrite material except in the region of said Hall plate, said core adjacent said Hall plate comprising layers of high resistivity ferrite in contact with said Hall plate.

12. An oscilloscope probe device for accurately measuring current in a conductor over a wide frequency range comprising:
a magnetic core forming a closed magnetic circuit and having a mechanically movable portion which may be opened to accept a current carrying conductor and closed again,
a coil wound upon the fixed portion of said core for providing a current indicative of a first alternating component of flux produced by current in said conductor linking said core, said current in said coil producing a flux in said core for nulling the flux produced by said conductor,
a Hall device comprising a Hall plate inserted across the cross-section of the fixed portion of said core and having first connections for providing a current across said Hall plate and connections at orthogonal points on said Hall plate for providing an output current indicative of flux in said core including the steady value thereof and lower frequency alternating current components,
first amplifier means for substantially linearly amplifying said last mentioned current over at least a substantial portion of the pass band of the Hall device for applying the same to said coil in a direction for nulling the flux in said core at lower frequencies, and output means for ascertaining the combined current in said coil as a result of voltage induced therein at higher frequencies and provided via said first amplifier means by said Hall device at lower frequencies.

13. The apparatus according to claim 12 wherein said output means for measuring the combined current comprises an output impedance in series with a series circuit including said coil and the output of the first amplifier means, said first amplifier means having a low and substantially linear output impedance in the frequency range of at least higher frequency signals, thus supplying the return path for currents derived from said coil.

14. The apparatus according to claim 13 wherein said first amplifier means is provided with a capacitor shunting the output thereof so as to provide said low output impedance at higher frequencies.

15. The apparatus according to claim 12 wherein said output means for measuring the combined current comprises a second amplifier means coupled to said coil for alternating currents, a summing amplifier means, and means for applying the output of the first amplifier means and the output of said second amplifier means to said summing amplifier means in an additive sense to provide an output indicative of the combined current in said coil.

References Cited
UNITED STATES PATENTS

| | | | |
|---|---|---|---|
| 2,928,048 | 3/1960 | Postal | 324—117 XR |
| 3,323,056 | 5/1967 | Haley | 324—127 |
| 3,422,351 | 1/1969 | Pihl | 324—117 |

RUDOLPH V. ROLINEC, Primary Examiner

E. F. KARLSEN, Assistant Examiner

U.S. Cl. X.R.
324—45, 127

PO-1050
(5/69)

UNITED STATES PATENT OFFICE
CERTIFICATE OF CORRECTION

Patent No. 3,525,041      Dated August 18, 1970

Inventor(s) W. B. Velsink

It is certified that error appears in the above-identified patent and that said Letters Patent are hereby corrected as shown below:

Col. 2, line 69, "later" should be --latter--

Col. 3, line 9, "high" should be --higher--

Claim 5, col. 6, line 30, "opposed" should be --opposing--

Claim 12, col. 7, line 38, after "device" should be inserted --and--

SIGNED AND SEALED
NOV 17 1970

(SEAL)
Attest:

Edward M. Fletcher, Jr.
Attesting Officer

WILLIAM E. SCHUYLER, JR.
Commissioner of Patents